June 13, 1950     A. J. ELIAN     2,511,702
PROJECTION SCREEN
Filed Jan. 13, 1949
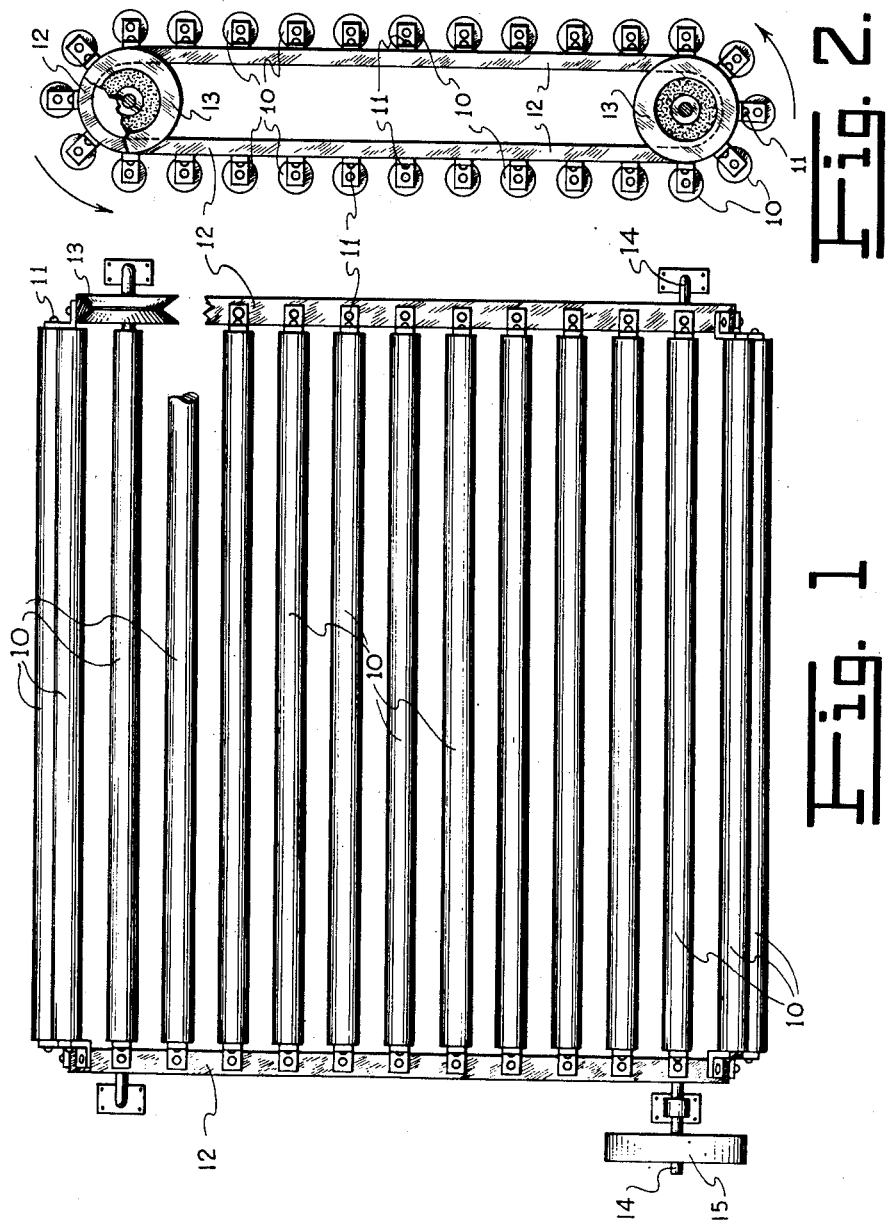

Patented June 13, 1950

2,511,702

UNITED STATES PATENT OFFICE 2,511,702

PROJECTION SCREEN

Arthur J. Elian, Mexico City, Mexico

Application January 13, 1949, Serial No. 70,789
In Mexico April 21, 1948

1 Claim. (Cl. 88—28.9)

This invention refers to photographic or motion picture projection screens, and more particularly to certain useful improvements in movable screens for receiving and reflecting luminous, photographic or motion-picture projections with a greater naturalness and with a sensible effect of depth or third dimension.

The main purpose of the screen I have invented is to give more naturalness to luminous photographic or motion-picture projections, whether these projections are motionless or otherwise, because in spite of the great technical progress reached both in photography and in the motion picture projectors, the naturalness desired has not so far been attained, that is to say an effect of depth in the image, and therefore, although provided with motion, they are lacking such naturalness as is only obtained with the effect of the third dimension, as in the case of stereoscopy, for illusion to be complete.

Synoptically my invention refers to a new form of projection screens to which motion has been given, because if cinematography is but a series of images which, on account of the pre-determined speed of their projection, seem to have a uniform and continued motion, the screen I have invented moves about as the luminous images are projected upon it, and therefore an effect of depth or of third dimension is obtained, as it may be more clearly appreciated through the following description of the screen.

The characteristic details of the screen I have invented will be clearly apparent in the course of the following description, as well as in the drawings shown as an illustration thereof, the same reference numbers being used to show the same parts in both figures.

According to these drawings:

Fig. 1 shows an elevation view from in front, of a movable screen made according to my invention, and Fig. 2 is an elevation from a lateral or profile view of the same screen, in which it is clearly shown how said screen, composed of cylindrical pieces, has no solution of continuity and turns on shaft-mounted pulleys.

Before describing in detail the screen I have invented, such as shown in the accompanying drawings, I want to make it perfectly clear that the latter illustrate merely as an example one of the preferred forms to carry my invention to practice, though this invention should not by any means be limited to the specific details herein illustrated and described, and all such variations and modifications as may be deemed to be advisable may be effected, provided they do not deviate from the principles and scope of my invention and provided, moreover, they comply with the stipulations of the claims hereinafter itemized. Thus, for instance, the succession of cylindrical pieces making up the screen may be either hollow or solid, and the fastening or holding means onto the belts giving motion thereto may be quite diverse or variable. To say it in a few words, the substantial characteristic of the screen I have invented is that the latter is formed by the succession of cylindrical pieces that are adequately interspaced and have such a motion that the projection appears as continuous on the curved surfaces of said cylindrical pieces.

Just as shown in the accompanying drawings, the screen I have invented consists of the succession of cylindrical pieces 10, that are arranged in parallelism and at a certain distance from one another. As stated before, these cylindrical pieces may be either tubular or massive.

The cylindrical members 10 are fastened on their ends and by means of adequate means 11 to the two belts 12, mounted on their respective pulleys 13, which in turn are fastened to the shafts 14, one of which is to be the moving pulley by means of a gearing pulley or a similar device 15, to which power is applied. As the pulley or gear 15 moves and as it communicates its rotating movement to the respective shaft 14, the pulleys 13 rotate also by means of belts 12 comprising in their motion the cylindrical members 10, as shown by the arrows in Fig. 2 of the accompanying drawings.

The cylindrical pieces 10 will have such an external finish as is adequate to reflect the image projected. The direction given to the motion of said cylinders may adopt any sense.

Naturally any adequate supporting structure can be used for the above-mentioned disposition and of course the pulleys on which the belts are mounted may be provided with bearings, while the shafts may be placed from one side of the screen to the other, or again they may be small so as to fasten only the pulleys.

The image is projected in front of the cylinders 10, in motion, and owing to this the images projected on said cylinders acquire a sense of depth or third dimension; this illusion is further increased owing to the fact that the rear part cylinders moving on an iversed direction receive also the same image but slightly larger on account of the longer distance between the projecting camera and the reflecting surfaces.

I claim:

A photographic screen comprising two pairs of pulleys mounted with their axes in co-planar relationship and with the axes of one pulley of each pair in coaxial relationship, the pulleys of each pair being spaced, an endless belt extending over each pair of pulleys, angle brackets secured to each belt in spaced relation with the angular arms extending outwardly at the adjacent sides of said belts, said angle brackets being arranged in pairs with one on each belt, a cylindrical reflecting member extending between each pair of brackets, pins extending through the outward angle arms of each bracket and axially connected with the respective cylindrical members to support said members beyond said belts and the peripheries of said pulleys, and means for driving one of said pulleys at a uniform speed.

ARTHUR J. ELIAN.

REFERENCES CITED

The following references are of record in the file of this patent:

UNITED STATES PATENTS

| Number | Name | Date |
|---|---|---|
| 1,728,462 | Wyland | Sept. 17, 1929 |
| 2,132,904 | Martinez | Oct. 11, 1938 |

FOREIGN PATENTS

| Number | Country | Date |
|---|---|---|
| 63,389 | Switzerland | Dec. 30, 1912 |
| 349,557 | Germany | Nov. 11, 1919 |
| 797,523 | France | Feb. 17, 1936 |